(12) United States Patent
Acharya et al.

(10) Patent No.: US 10,123,309 B2
(45) Date of Patent: Nov. 6, 2018

(54) SYSTEM AND METHOD FOR DISCOVERY AND ACQUISITION OF A CONTROL CHANNEL USING GUARD BANDS

(71) Applicant: CISCO TECHNOLOGY, INC., San Jose, CA (US)

(72) Inventors: Shwetang Sureshkumar Acharya, Bangalore (IN); Raghavendra Kankanhalli Sudheendra, Bangalore (IN); Nalini Sankaranarayanan, Bangalore (IN); Rajaguru Veluchamy, Chennai (IN); Srinath Gundavelli, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/371,016

(22) Filed: Dec. 6, 2016

(65) Prior Publication Data

US 2018/0160415 A1 Jun. 7, 2018

(51) Int. Cl.
*H04L 12/28* (2006.01)
*H04W 72/04* (2009.01)
*H04J 1/16* (2006.01)

(52) U.S. Cl.
CPC .............................. *H04W 72/0406* (2013.01)

(58) Field of Classification Search
CPC ................................................. H04W 72/0406
USPC ...................................... 370/252, 329, 386
See application file for complete search history.

(56) References Cited

U.S. PATENT DOCUMENTS

| 5,289,496 | A | * | 2/1994 | Nakagawa | H04B 1/713 375/135 |
|---|---|---|---|---|---|
| 9,049,686 | B2 | | 6/2015 | Kim et al. | |
| 9,220,119 | B2 | | 12/2015 | Kim et al. | |
| 2009/0135767 | A1 | * | 5/2009 | Silk | H04W 16/14 370/329 |
| 2013/0072232 | A1 | * | 3/2013 | Lee | H04W 48/14 455/456.2 |
| 2013/0300941 | A1 | | 11/2013 | Kafle et al. | |
| 2014/0321409 | A1 | * | 10/2014 | Kim | H04W 16/14 370/329 |

(Continued)

OTHER PUBLICATIONS

U.S. Appl. No. 15/367,051, filed Jan. 17, 2007, entitled "System and Method for Control Channel Determination and Detection in an Opportunistic Wireless Network Environment," Inventor(s) Shwetang Sureshkumar Acharya, et al.

(Continued)

*Primary Examiner* — John Pezzlo
(74) *Attorney, Agent, or Firm* — Patterson + Sheridan, LLP

(57) ABSTRACT

An example apparatus for discovery and acquisition of a control channel using guard bands is provided and includes a processor; and a memory in communication with the memory. The processor configured is to determine that a whitespace map is unavailable for communication between a first device and a second device; determine that a guard band is to be used for a control channel between the first device and the second device; send a first message to the second device including an indication to the second device that the second device is use a guard band to maintain communication with the first device; and send a second message to the second device including control channel tuning information associated with the guard band.

21 Claims, 6 Drawing Sheets

(56) References Cited

U.S. PATENT DOCUMENTS

2015/0063332 A1    3/2015  Lee et al.
2015/0296502 A1*  10/2015  Gerhardt .................. H04L 5/14
                                                    370/280
2018/0025081 A1*   1/2018  Denninghoff ........ H03H 9/1092

OTHER PUBLICATIONS

Flores, Adriana B., et al., "IEEE 802.11af: A Standard for TV White Space Spectrum Sharing," IEEE Communications Magazine, Oct. 2013; 9 pages.

\* cited by examiner

SYSTEM AND METHOD FOR DISCOVERY AND ACQUISITION OF A CONTROL CHANNEL USING GUARD BANDS

TECHNICAL FIELD

This disclosure relates in general to the field of communications and, more particularly, to a system and method for discovery and acquisition of a control channel using guard bands.

BACKGROUND

Radio spectrum (3 kHz-300 GHz) is a finite and scarce resource. Most of today's radio systems require rigorous protection against interference from other radio devices. Such protection is often provided by exclusive use of an assigned radio spectrum. Most of the radio spectrum is therefore licensed to traditional communication system and services. However, with this approach spectrum resources are sometimes wasted for various reasons. For example, any economic failure of licensed radio services and systems may lead to unused spectrum. As another example, public safety and military radio systems often require spectrum use only occasionally. In still another example, technological progress in communication systems has resulted in the improvement in spectral efficiency. As a result, certain frequency bands, called "white space" licensed to operators may be shared by secondary users. White space refers to portions of a licensed radio spectrum that licensees do not use all of the time or in all geographic locations. This white space spectrum may be dynamically accessed by registered and/or valid secondary users in order to share the spectrum when it is not used by the licensee.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example apparatus for discovery and acquisition of a control channel using guard bands is provided and includes a processor; and a memory in communication with the memory. The processor configured is to determine that a whitespace map is unavailable for communication between a first device and a second device; determine that a guard band is to be used for a control channel between the first device and the second device; send a first message to the second device including an indication to the second device that the second device is use a guard band to maintain communication with the first device; and send a second message to the second device including control channel tuning information associated with the guard band.

Example Embodiments

Figure 1:
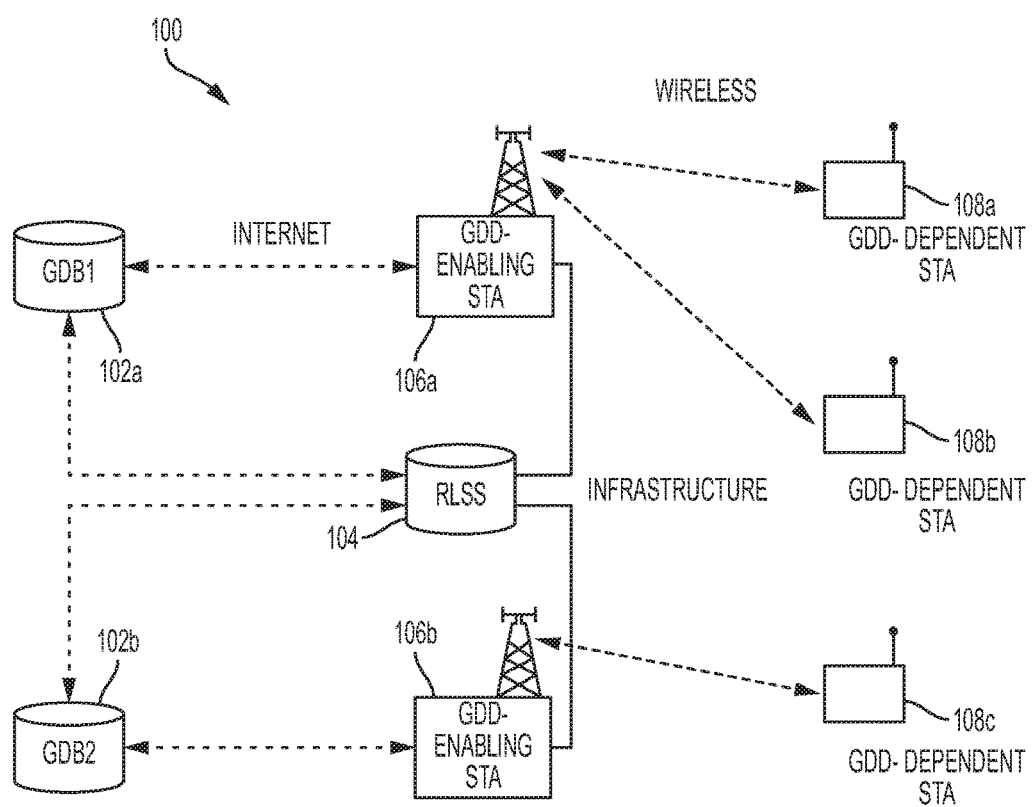
FIG. 1 is a simplified block diagram illustrating a communication system for discovery and acquisition of a control channel using guard bands in accordance with one example embodiment.

Referring now to FIG. 1, FIG. 1 is a simplified block diagram illustrating a communication system 100 for discovery and acquisition of a control channel using guard bands in accordance with one example embodiment. FIG. 1 illustrates a communication network 100 (indicated generally by an arrow) including a first geolocation database (GDB) 102a, a second geolocation database (GDB) 102b, a registered location secure server (RLSS) 104, a first geolocation database dependent(GDD)-enabling station 106a, a second GDD-enabling station 106b, a first GDD-dependent station 108a, a second GDD-dependent station 108b, and a third GDD-dependent station 108c. In particular embodiments, communication network 100 includes an Institute of Electrical and Electronics Engineers (IEEE) 802.11af network. First GDB 102a is in communication with RLSS 104 and first GDD-enabling station 106a via an Internet connection, and second GDB 102b is in communication with RLSS 104 and second GDD enabling station 106b via an Internet connection. RLSS 104 has an infrastructure connection (such as a wired connection) to each of first GDD-enabling station 106a and second GDD-enabling station 106b. First GDB-enabling station 106a is in wireless communication with first GDD-dependent station 108a and second GDD-dependent station 108b. Second GDD-enabling station 106b is in wireless communication with third GDD-dependent station 108c. In one or more embodiments, first GDB-enabling station 106a, second GDB-enabling station 106b, first GDD-dependent station 108a, second GDD-dependent station 108b, and third GDD-dependent station 108c are each whitespace device (WSD) enabled to communicate using television whitespaces (TVWS). In various embodiments, first GDD-enabling station 106a and second GDD-enabling station 106b are master WSDs, and first GDD-dependent station 108a, second GDD-dependent station 108b, and third GDD-dependent station 108c are slave WSDs. Further, in one or more embodiments, first GDD-enabling station 106a, second GDD-enabling station 106b, first GDD-dependent station 108a, second GDD-dependent station 108b, and third GDD-dependent station 108c are capable of transmitting in one or more of Wi-Fi/DTT/LTE frequency bands.

Recently, there has been a great deal of interest from the communications industry in the use of UHF digital terrestrial TV (DTT) frequencies by so-called cognitive radios or whitespace devices (WSDs). Television whitespaces (TVWS) is a block of UHF/VHF frequencies which was originally allocated for analog terrestrial broadcasting services (such as TV, wireless microphones, news gathering, etc.), typically ranging from 450-790 MHz. After digitization of television broadcasting, This block is currently being freed up in chunks due to widespread digitization of TV transmissions and may differ in different geographical regions. TVWS access is a promising approach to address spectrum scarcity problems due to a large amount of TVWS spectrum resources and better propagation properties of TVWS (TV White Space) channels.

In today's wireless communications, some of the available spectrum is not utilized for any kind of transmission. This is usually a very narrow band frequency range, which is used to separate two wider frequency ranges, termed as a guard band. A guard band resides on either sides of a communication channel and occupies roughly 10% of spectrum across every major frequency band used for LTE/DTT/Wi-Fi, etc. Typically guard bands are used to insulate transmission on adjacent frequencies to prevent mutual interference. DTT, Wi-Fi, LTE etc., normally use orthogonal frequency-division multiplexing (OFDM) which spreads more energy into nearby frequencies, therefore requiring a large guard band to mitigate the interference effect.

Current wireless network deployments utilizing whitespaces are based on the concept of Dynamic Spectrum Sharing (DSS). Industry researchers have conceptualized two such architectures, encapsulated in IEEE 802.11af and IEEE 802.22. Though each of these standards differ terminologies and functionalities, the underlying concept includes a spectrum sharing policy and relies on the following building blocks: a geolocation database (GDB); a master station (MS), a slave station (SS), and a Procedure to Access White Space (PAWS) protocol as defined in RFC 7545.

Generally, a geolocation database (GDB) is a database that holds a list of available whitespace frequencies to be leased for secondary purposes in a time and space domain such that a particular geographic region is identified as being allocated particular whitespace frequencies at particular times within the database. The GDB stores, by geographic location, the permissible frequencies and operating parameters for whitespace devices to fulfill regulatory requirements. GDBs are often authorized and administered by regulatory authorities, and the GDB's operation depends upon the security and time requirements of the applied regulatory domain. The database contains a list of frequencies, which is called a whitespace map (WSM) specific to a geolocation. This list may contain other associated attributes such as lease time, and transmit power levels. The GDD allocations the WSM to a requesting end station based on its geographic parameters such as longitude, latitude, and height/gain of the requesting station.

A whitespace device (WSD) is a communication device designed to operate in TVWS frequencies (e.g., UHF/VHF band). A master WSD serves and controls one or more slave WSDs and a slave WSD serves the purpose of connecting end-user client devices to the network and may use any traditional end-user access technology such as Ethernet/WiFi to accomplish this purpose. The Procedure to Access Whitespaces (PAWS) protocol is a protocol which defines a set of query-response message structures used between the requesting WSD and the GDB as specified in RFC 7545 of the Internet Engineering Task Force (IETF). A control channel is a specific frequency selected by the master WSD from a downloaded WSM. The control channel is required for the slave WSD to interact with the master WSD to exchange control information and other relevant negotiation parameters.

The Institute of Electrical and Electronics Engineers (IEEE) formed the IEEE 802.22 Working Group to develop protocols for an interoperable air interface for use in spectrums allocated to TV broadcast service and to provide wireless services such as broadband access a point-to-multipoint wireless regional area network (WRAN). IEEE 802.22 specifies that a network should operate in a point-to-multipoint basis (P2MP). A system should be formed by base stations (BSs), such as master WSDs, and customer premise equipment (CPE) such as slave WSDs or access points. The CPEs are attached to a base station via wireless links in a specified frequency range and each base station controls the medium access for all CPEs attached to it.

Referring again to FIG. 1, in one or more embodiment first GDB 102a and second GDB 102b each store, by geographic location, permissible frequencies and operating parameters for WSDs. Registered Location Secure Server (RLSS) 104 is a local geolocation database that holds the permissible operational parameters for first GDD-enabling station 106a, second GDD-enabling station 106b, first GDD-dependent station 108a, second GDD-dependent station 108b, and third GDD-dependent station 108c. RLSS 104 operates as a local database that contains the geographic location and operating parameters for a small number of basic service sets (BSSs). RLSS 104 distributes permitted operating parameters to access points (APs) and stations (STAs) within the BSSs under the control of RLSS 104. Just as the operation of the GDB may depend upon the security and time requirements of regulatory domains, the role that RLSS 104 plays in the network may vary across regulatory domains. First GDD-enabling station 106a is a wireless access point that controls the operation of first GDD-dependent station 108a and second GDD-dependent station 108b after acquiring a valid whitespace map (WSM) for the location it serves. Second GDD-enabling station 106b is a wireless access point that controls the operation of third GDD-dependent station 108c. Accordingly, first GDD-dependent station 108a and second GDD-dependent station 108b are each under control of first GDD-enabling station 106a, and third GDD-dependent station 108c is under control of second GDD-enabling station 106b.

In a DSS environment, it is imperative to secure a communication between the master WSD and the slave WSD to allow the exchange of informational parameters such as device capabilities, whitespace map availability, request messages, response messages, notification messages, and heartbeat messages. There may be situations arise in which both the master WSD and the slave WSD may lose connectivity with the GDB, and the WSM they are currently using may be due for expiry, after which they should renew/request for a new WSM. There may also be situations in which the GDB responds will a null WSM, which may lead to a total in communication between the master WSD and slave WSD. In such circumstances, it becomes important to secure a minimum available resource to maintain a basic level of communication between the master WSDs and slave WSDs so that they do not need to go through the cycle of acquiring a fresh control channel. In accordance with various embodiments described herein, guard bands are used to establish a communication channel under such circumstances.

Various embodiments described herein provide for a mechanism for discovery and acquisition of a control channel using guard bands. In accordance with one or more embodiments, a failsafe control channel between a GDD-enabling station (such as first GDD-enabling station 106a) and a GDD-dependent station (such as first GDD-dependent station 108a) is establishing using a guard band to maintain constant communication therebetween in the event of the reception of an NULL-WSM from RLSS 104 or if the current WSM is due to expire and the reachability to RLSS 104 is lost. The reception of a NULL-WSM from RLSS 104 is indicative that there are currently no whitespace frequencies available for use by the GDD-enabling station at the present time.

In accordance with one or more embodiments, it is assumed that first GDD-dependent station 108a is already connected to first GDD-enabling station 106a such that first GDD-enabling station 106a and first GDD-dependent station 108a are initially associated with each other and are in an operating state. When the WSM is due for expiry, first GDD-enabling station 106a needs to refresh the WSM from RLSS 104 or GDB 102. If RLSS 104 responds with a NULL-WSM, first GDD-enabling station 106a determines to use the guard bands for a control channel between first GDD-enabling station 106a and first GDD-dependent station 108a using a predetermined set of rules and needs to notify first GDD-dependent station 108a. The NULL-WSM from RLSS 104 is an indication that there is no available frequency for which to operate. In response to receiving the NULL-WSM, first GDD-enabling station 106a sends a Contact Verification Signal (CVS) with an updated MAP-ID field to first GDD-dependent station 108a. A Contract Verification Signal (CVS) is typically sent by a GDD-enabling station to establish whether a GDD-dependent station is within the reception range of the GDD-enabling station, and to ensure operation under a valid WSM. The CVS is sent by a GDD enabling STA to serve two purposes. First, the transmission of the CVS establishes which GDD-dependent STAs are within the reception range of a GDD-enabling STA. Second, the CVS helps the GDD-dependent STA ensure operation under a valid whitespace map (WSM) and that it corresponds to the serving GDD enabling STA. To validate operation under a correct WSM, the GDD-dependent STA utilizes the MAP-ID field in the CVS frame. If the MAP-ID value in the CVS frame is equal to its existing WSM, the GDD-dependent STA assumes the operating WSM is valid and resets its enablement validation timer. However, if the MAP-ID field is different WSM ID, the GDD-dependent STA transmits a Channel Availability Query (CAQ) request message to obtain the valid WSM in a CAQ response message. If the GDD-dependent STA does not obtain the valid WSM, it stops transmission after the enablement validation timer has expired. Through the channel availability query procedure, STAs obtain the available radio frequencies that allow operation in their location in the form of the whitespace map (WSM).

In the CAQ process, RLSS 104 grants the WSM to the CAQ requesting STA. However, in some regulatory domains the RLSS is required to access the GDB to obtain the channel availability information. In one or more embodiments, the CAQ request may contain multiple device locations. The CAQ responding STA restricts the WSM validity to either a unique device location or a bounded area of multiple locations. The GDD-dependent STA performs a CAQ request to a GDD-enabling STA in three different cases: first, to remain in the GDD enable state after enablement times out; second, when a change in channel availability is indicated by the GDD-enabling STA through a CVS; and third, if the GDD-dependent STA has moved beyond the regulatory permitted distance.

First GDD-enabling station 106a responds to the CAQ with a CAQ-Response message that is modified to include an indication to first GDD-dependent station 108a that first GDD-dependent station 108a is to start using guard bands to maintain further communication with first GDD-enabling station 106a. In particular embodiments, the CAQ response message is modified by first GDD-enabling station 106a to include a "Reason: Result code=7" to indicate that first GDD-dependent station 108a is to start using guard bands to maintain further communication with first GDD-enabling station 106a. Soon after sending the CAQ response message, first GDD-enabling station 106a sends out a Public Action Frame to first GDD-dependent station 108a with a "public action field=35" as an indication that the Public Action Frame contains a channel tuning information field which includes guard band tuning information. Upon receiving the Public Action Frame, first GDD-dependent station 108a looks at the "public action field=35" and determines that since this field is set to 35 as an indication to first GDD-dependent station 108a to look further look at the "Channel Tuning Info" field to fetch data on which guard band frequencies to tune to maintain a communication channel with first GDD-enabling station 106a.

In another embodiment, instead of sending a Publication Action Frame to first GDD-dependent station 108a, first GDD-enabling station 106a send a Registered Vendor Specific Element according to a Registered Location Query Protocol (RLQP) including the channel tuning information related to the guard band to first GDD-dependent station 108a for situations in which the devices/stations are pre-registered to follow q RLQP protocol.

First GDD-dependent station 108a validates whether it can tune to the indicated guard band frequency and tunes to that guard band frequency if it is able. In accordance with some embodiments, if first GDD-dependent station 108a cannot tune to the guard band frequency, it may switch off its radio after the WSM expires and remain unconnected from the network.

Figure 2:
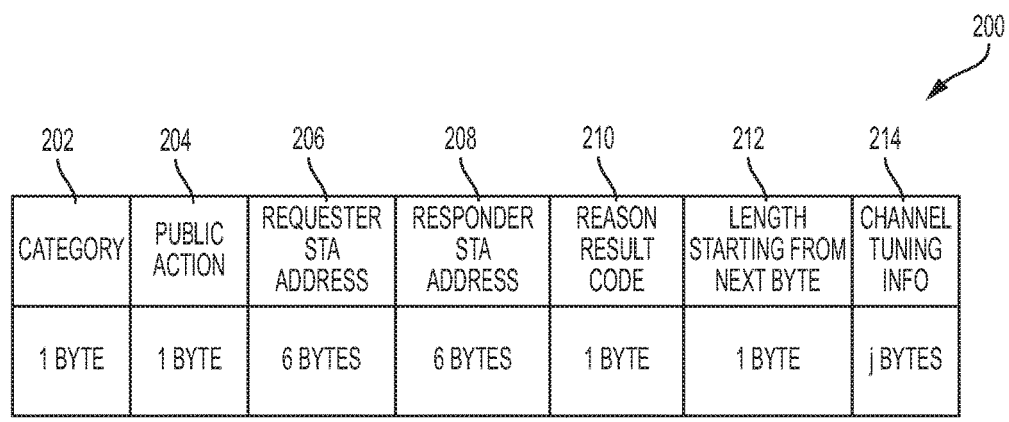
FIG. 2 illustrates a Public Action Frame (PAF) according to one embodiment.

FIG. 2 illustrates a Public Action Frame (PAF) 200 according to one embodiment. PAF 200 includes a Category Field 202 of one byte length, a Public Action field 204 of one byte length, a Requester Station Address field 206 of six bytes length, a Responder Station Address field 208 of six bytes length, a Reason Result Code field 210 of one byte length, a Length Starting From Next Byte field 212 of one byte length, and a Channel Tuning Information field 214 of j bytes length. The Category Field 202 indicates a category for Public Action Frame 200 and includes a value of 4 for a public category, a value of 125 for a vendor specified protected category, or a value of 127 for a vendor specific unprotected category. The Public Action field 204 includes a value of 35 as an indication that the Public Action Frame 200 contains Channel Tuning Information field 214 which includes guard band tuning information. Requester Station Address field 206 and Responder Station Address field 208 include an indication of the addresses of the requesting station and responding station, respectively. In one or more embodiments, the Request Station Address field 208 may be NULL such as in cases when the master station sends a broadcast message. Reason Result Code field 210 includes a reason result code value of 7 as a result of the master WSD receiving a NULL WSM, and Length Starting From Next Byte field 212 provides an indication of the length of Channel Tuning Information field 214 starting from the next byte. Channel Tuning Information field 214 includes channel tuning information to allow first GDD-dependent station 108a to connect to the guard band indicated by first GDD-enabling station 106a. The channel tuning information may includes one or more of an indication of a frequency of the guard band to be used for the control channel, a symbol rate, a forward error correcting scheme, and a modulation scheme.

Figure 3:
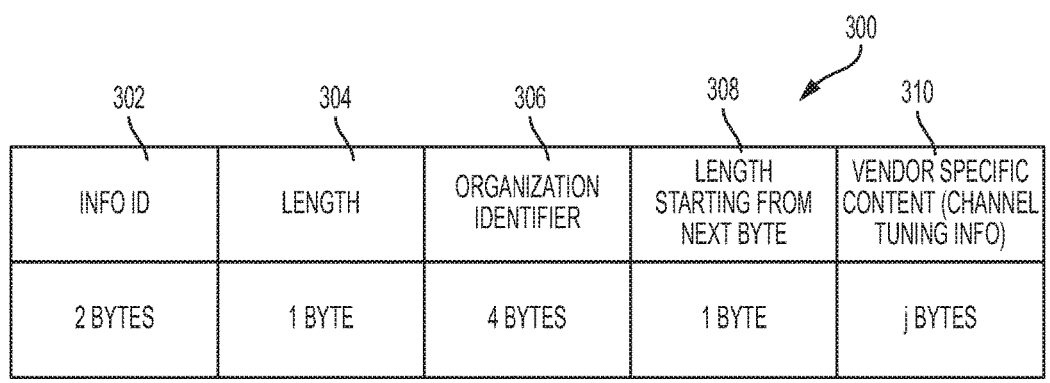
FIG. 3 illustrates a Registered Vendor Specific Element according to one embodiment.

FIG. 3 illustrates a Registered Vendor Specific Element 300 according to one embodiment. Registered Vendor Specific Element 300 includes a Info ID field 302 of two bytes length, a Length field 304 of one byte length, an Organization Identifier field 306 of four bytes length, a Length Starting From Next Byte field 308 of one byte length, and a Vendor Specific Content field 310 of j bytes length. The Info ID field 302 includes a value of 56797 to identify the Registered Vendor Specific Element 300 as vendor specific. The Length field 304 includes a value of 5+j bytes. The Organization Identifier field 306 includes an organization identifier for the registered vendor. The Length Starting From Next Byte field 308 includes an indication of a length of the packet starting from the next byte. The Vendor Specific Content field 310 includes the channel tuning information to allow first GDD-dependent station 108a to connect to the guard band indicated by first GDD-enabling station 106a. In particular embodiments, the channel tuning information includes tuning information for the guard band and may include one or more parameters providing an indication of a frequency of the guard band to be used for the control channel, a symbol rate, and a forward error correcting (FEC) scheme depending upon a modulation scheme selected by a master WSD based on hardware and/or software capability.

Turning to the infrastructure of communication system 100, the network topology can include any number of whitespace devices, customer premises equipment, servers, switches (including distributed virtual switches), routers, and other inter-connected nodes. A node may be any electronic device, computer, printer, hard disk drive, client, server, peer, service, application, or other object capable of sending, receiving, amplifying, splitting, or forwarding signals over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

One or more networks may offer a communicative interface between network elements of communication system 100, and may include or be in communication with any local area network (LAN), wireless local area network (WLAN), metropolitan area network (MAN), Intranet, Internet, Extranet, wide area network (WAN), virtual private network (VPN), or any other appropriate architecture or system that facilitates communications in a network environment. Communication system 100 may implement any suitable communication protocol for transmitting and receiving data packets within communication system 100. The architecture of the present disclosure may also operate in conjunction with any suitable protocol, where appropriate and based on particular needs. In addition, gateways, routers, switches, and any other suitable nodes (physical or virtual) may be used to facilitate electronic communication between various nodes in the network.

In some embodiments, a communication link may represent any electronic link supporting a network environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), coaxial fiber, telephone lines, T1 lines, T3 lines, wireless, satellite, fiber optics, cable, Ethernet, etc. or any combination thereof) and/or through any additional networks such as a wide area networks (e.g., the Internet).

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 100. It should be understood that communication system 100 shown in FIG. 1 is simplified for ease of illustration.

Figure 4:
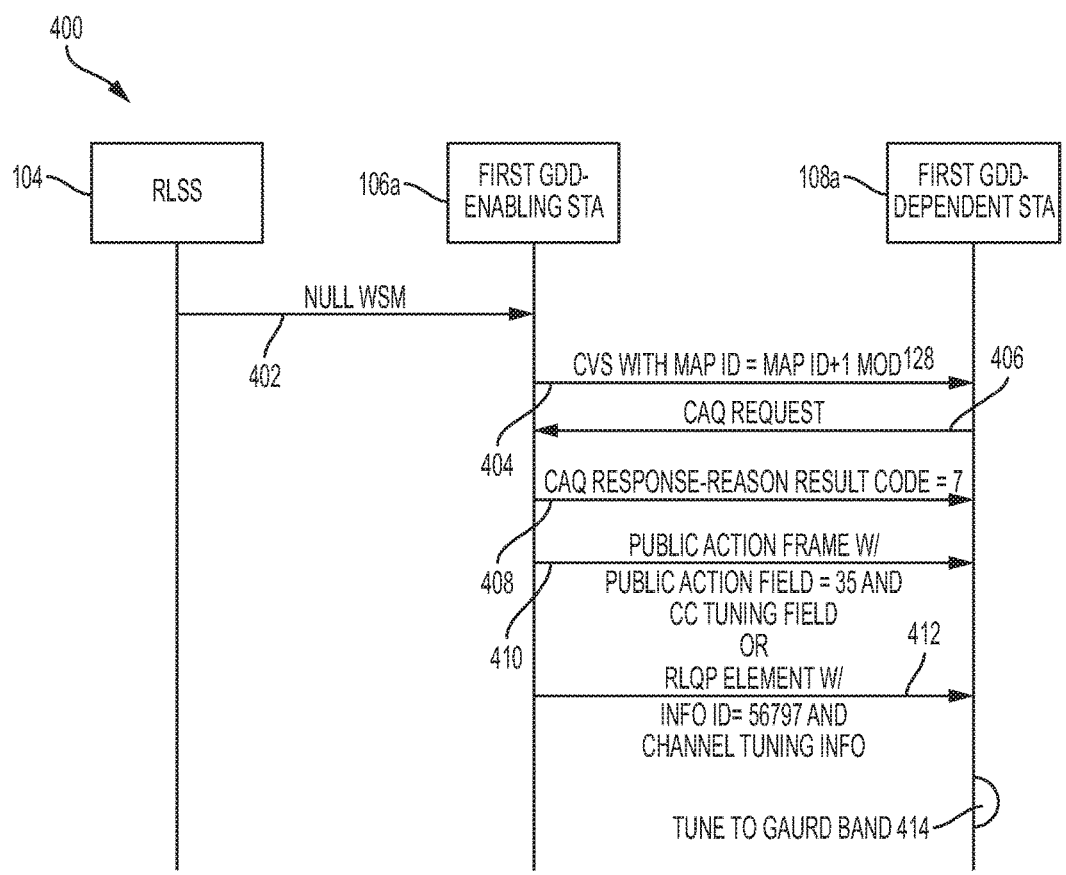
FIG. 4 is a simplified signal flow diagram illustrated example operations that may be associated with embodiments of communication system of FIG. 1.

Referring now to FIG. 4, FIG. 4 is a simplified signal flow diagram illustrated example operations 400 that may be associated with embodiments of communication system 100. In 402, RLSS 104 sends a NULL-WSM to first GDD-enabling station 106a. First GDD-enabling station 106a determines that guard bands are to be used for a control channel between first GDD-enabling station 106a and first GDD-dependent station 108a. In response to receiving the NULL-WSM, in 404 first GDD-enabling station 106a sends a Contact Verification Signal (CVS) with an updated MAP-ID field (MAP ID=MAP ID+1 MOD 128) to first GDD-dependent station 108a. Upon receiving the CVS over the existing communication path, first GDD-dependent station 108a determines that the MAP-ID has changed and sends out a Channel Availability Query (CAQ) request message in 406.

In 408, first GDD-enabling station 106a responds to the CAQ with a CAQ-Response message that is modified to include a "Reason: Result code=7" to indicate that first GDD-dependent station 108a is to start using guard bands to maintain further communication with first GDD-enabling station 106a. After sending the CAQ response message, in 410 first GDD-enabling station 106a sends out a Public Action Frame to first GDD-dependent station 108a with a "public action field=35" as an indication that the Public Action Frame and a category field having a value of 126 for a vendor specific protected category, a value of 126 for a vendor specific unprotected category, or a value of 4 for any other type of category. The Public Action Frame further contains a control channel tuning information field which includes guard band tuning information. In an alternative embodiment instead of sending the Public Action Frame, in 412 first GDD-enabling station 106a sends a RLQP Element message with an info ID equal to 56797 and including a control channel tuning information field which includes the guard band tuning information.

In 414, first GDD-dependent station 108a looks at the control channel tuning information field to tune to the guard band frequency to maintain a communication channel with first GDD-enabling station 106a.

Figure 5:
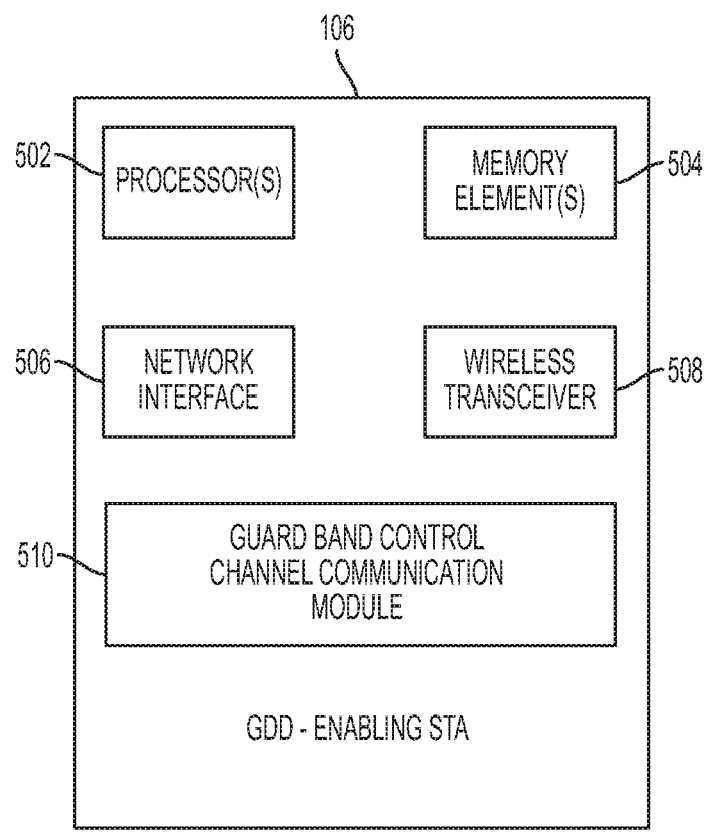
FIG. 5 illustrates a simplified block diagram of a GDD-enabling station of FIG. 1 according to one embodiment.

Referring now to FIG. 5, FIG. 5 illustrates a simplified block diagram of a GDD-enabling station 106 of FIG. 1 according to one embodiment. In various embodiments, GDD-enabling station 106 may include one or more of first GDD-enabling station 106a and second GDD-enabling station 106b of FIG. 1. GDD-enabling station 106 includes one or more processor(s) 502, one or more memory elements 504, a network interface 506, a wireless transceiver 508, and a guard band control channel communication module 510. Processor(s) 502 is configured to execute various tasks of GDD-enabling station 106 as described herein and memory element(s) 504 is configured to store data associated with GDD-enabling station 106 such as a WSM received from RLSS 104. Network interface 506 is configured to interface GDD-enabling station 106 with one or more of network elements and/or networks. Wireless transceiver 508 is configured to allow GDD-enabling station 106 to communicate using a wireless communication protocol such as one or more of TVWS, Wi-Fi, DTE, or LTE. Guard Band control channel communication module 510 is configured to determine guard band control channel information and communicate the guard band control channel information to a GDD-dependent station as described herein.

In one implementation, GDD-enabling station 106 is a network element that includes software to achieve (or to foster) the control channel determination and other operations of the GDD-enabling station 106 as outlined herein in this Specification. Note that in one example, each of these elements can have an internal structure (e.g., a processor, a memory element, etc.) to facilitate some of the operations described herein. In other embodiments, these control channel determination operations may be executed externally to this elements, or included in some other network element to achieve this intended functionality. Alternatively, GDD-enabling station 106 may include this software (or reciprocating software) that can coordinate with other network elements in order to achieve the operations, as outlined herein. In still other embodiments, one or several devices may include any suitable algorithms, hardware, software, components, modules, interfaces, or objects that facilitate the operations thereof.

Figure 6:
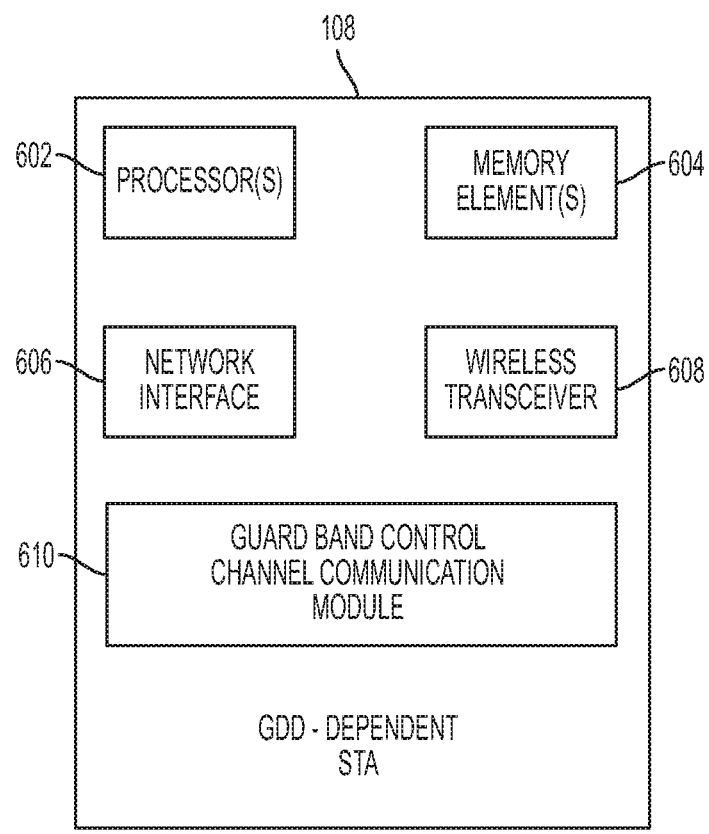
FIG. 6 illustrates a simplified block diagram of a GDD-dependent station of FIG. 1 according to one embodiment.

Referring now to FIG. 6, FIG. 6 illustrates a simplified block diagram of a GDD-dependent station 108 of FIG. 1 according to one embodiment. In various embodiments, GDD-dependent station 108 may include one or more of first GDD-dependent station 108*a*, second GDD-dependent station 108*b*, and third GDD-dependent station 108*c* of FIG. 1. GDD-dependent station 108 includes one or more processor(s) 602, one or more memory elements 604, a network interface 606, a wireless transceiver 608, and a guard band control channel communication module 610. Processor(s) 602 is configured to execute various tasks of GDD-dependent station 108 as described herein and memory element(s) 604 is configured to store data associated with GDD-dependent station 108 such as a WSM received from a GDD-enabling station. Network interface 606 is configured to interface GDD-dependent station 108 with one or more of network elements and/or networks. Wireless transceiver 608 is configured to allow GDD-dependent station 108 to communicate using a wireless communication protocol such as one or more of TVWS, Wi-Fi, DTE, or LTE. Guard band control channel communication module 610 is configured to receive guard band control channel information from a GDD-enabling station and tune to the guard band indicated guard band control channel information to a maintain a control channel with a GDD-enabling station as described herein.

In one implementation, GDD-dependent station 108 is a network element that includes software to achieve (or to foster) the control channel determination and other operations of the GDD-dependent station 108 as outlined herein in this Specification. Note that in one example, each of these elements can have an internal structure (e.g., a processor, a memory element, etc.) to facilitate some of the operations described herein. In other embodiments, these control channel determination operations may be executed externally to this elements, or included in some other network element to achieve this intended functionality. Alternatively, GDD-dependent station 108 may include this software (or reciprocating software) that can coordinate with other network elements in order to achieve the operations, as outlined herein. In still other embodiments, one or several devices may include any suitable algorithms, hardware, software, components, modules, interfaces, or objects that facilitate the operations thereof.

Figure 7:
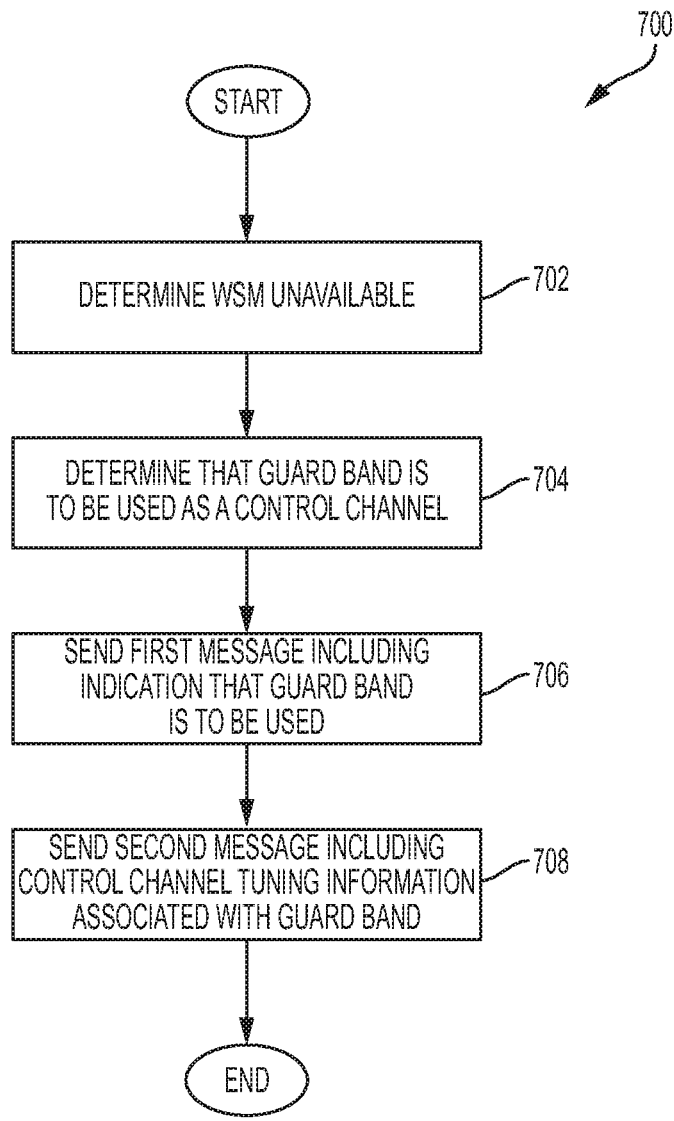
FIG. 7 is a simplified flow diagram illustrating example operations that may be associated with embodiments of the communication system of FIG. 1.

Referring now to FIG. 7, FIG. 7 is a simplified flow diagram illustrating example operations 700 that may be associated with embodiments of communication system 100. In 702, a first device (e.g. first GDD-enabling station 106*a*) determines that a whitespace map is unavailable for communication between the first device and a second device (e.g., first GDD-dependent station 108*a*). In accordance with various embodiments, determining that the whitespace map is unavailable for communication between the first device and the second device is responsive to receiving an indication of the unavailability of the whitespace map from a geolocation database 102 or RLSS 104. In particular embodiments, the indication of the unavailability of the whitespace map includes a null whitespace map. In other embodiments, determining that the whitespace map is unavailable includes a determination of a loss of connectivity with the database. In 704, the first device determines that a guard band is to be used for a control channel between the first device and the second device.

In 706, the first device sends a first message to the second device including an indication to the second device that the second device is use a guard band to maintain communication with the first device. In at least one embodiment, the first message is a Channel Availability Query (CAQ) response message having a field set to a predetermined value. In particular embodiments, the predetermined value is a Reason: result code set to a value of seven. In 708, first device sends a second message to the second device including control channel tuning information associated with the guard band. In various embodiments, the control channel tuning information includes at least one of a frequency, a symbol rate, a forward error correcting scheme, and a modulation scheme associated with the guard band. In particular embodiments, the second message is Public Action Frame having a public action field set to a predetermined value and a control channel tuning information field including the control channel tuning information. In particular embodiments, the predetermined value of the public action field is equal to 35. In one or more embodiments, the second device is configured to tune to the guard band using the control channel tuning information in order to establish a control channel between the first device and the second device. Accordingly, communication may be maintained between the first device and the second device until such time that a new WSM is available. The operations 700 then end.

Various embodiments described herein may provide one or more of the following advantages: (1) guard bands are known frequencies so complex spectrum scanning by GDD-dependent stations is eliminated; (2) in the event of WSM expiry, receipt of a NULL-WSM or loss of reachability to the RLSS, GDD-dependent stations can still use guard bands to stay connected with a GDD-enabling station; (3) prevents a total loss of communication state between the GDD-enabling station and the GDD-dependent station; and (4) provides a potential to aggregate guard bands for better throughput between GDD-enabling stations and GDD-dependent stations.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, GDD-enabling stations 106a-106b and GDD-dependent stations 108a-108c. In some embodiments, one or more of these features may be implemented in hardware, provided external to these elements, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, GDD-enabling stations 106a-106b and GDD-dependent stations 108a-108c described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element comprised in GDD-enabling stations 106a-106b and GDD-dependent stations 108a-108c can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor comprised in GDD-enabling stations 106a-106b and GDD-dependent stations 108a-108c) could transform an element or an article (e.g., data, or electrical signals) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 100 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 100 may be applicable to other exchanges or routing protocols. Moreover, although communication system 100 has been illustrated with reference to particular elements and operations that facilitate the communication process, these elements, and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. An apparatus, comprising:
a processor; and a memory in communication with the memory, the processor configured to:
- determine that a whitespace map is unavailable for communication between a first device and a second device;
- determine that a guard band is to be used for a control channel between the first device and the second device;
- send a first message to the second device including an indication to the second device that the second device is to use the guard band to maintain communication with the first device; and
- send a second message to the second device including control channel tuning information associated with the guard band, wherein the second message comprises a Public Action Frame comprising a public action field and a control channel tuning information field.

2. The apparatus of claim 1, wherein determining that the whitespace map is unavailable for communication between the first device and the second device is responsive to receiving an indication of the unavailability of the whitespace map from a geolocation database.

3. The apparatus of claim 2, wherein the indication of the unavailability of the whitespace map includes a null whitespace map.

4. The apparatus of claim 1, wherein the first message is a Channel Availability Query (CAQ) response message having a field set to a predetermined value.

5. The apparatus of claim 4, wherein the predetermined value is a Reason: result code set to a value of seven.

6. The apparatus of claim 1, wherein the control channel tuning information includes at least one of a frequency, a symbol rate, a forward error correcting scheme, and a modulation scheme associated with the guard band.

7. The apparatus of claim 1, wherein the public action field is set to a predetermined value and the control channel tuning information field includes the control channel tuning information.

8. The apparatus of claim 7, wherein the predetermined value of the public action field is equal to 35.

9. The apparatus of claim 1, wherein the second device is configured to tune to the guard band using the control channel tuning information.

10. A method executed at a first device in a wireless network, the method comprising:
- determining that a whitespace map is unavailable for communication between the first device and a second device;
- determining that a guard band is to be used for a control channel between the first device and the second device;
- sending a first message to the second device including an indication to the second device that the second device is to use the guard band to maintain communication with the first device; and
- sending a second message to the second device including control channel tuning information associated with the guard band, wherein the second message comprises a Public Action Frame comprising a public action field and a control channel tuning information field.

11. The method of claim 10, wherein determining that the whitespace map is unavailable for communication between the first device and the second device is responsive to receiving an indication of the unavailability of the whitespace map from a geolocation database.

12. The method of claim 11, wherein the indication of the unavailability of the whitespace map includes a null whitespace map.

13. The method of claim 10, wherein the first message is a Channel Availability Query (CAQ) response message having a field set to a predetermined value.

14. The method of claim 10, wherein the control channel tuning information includes at least one of a frequency, a symbol rate, a forward error correcting scheme, and a modulation scheme associated with the guard band.

15. The method of claim 10, wherein the public action field is set to a predetermined value and the control channel tuning information field includes the control channel tuning information.

16. Non-transitory tangible computer-readable media that includes instructions for execution, which when executed by a processor, is operable to perform operations comprising:
- determining that a whitespace map is unavailable for communication between a first device and a second device;
- determining that a guard band is to be used for a control channel between the first device and the second device;
- sending a first message to the second device including an indication to the second device that the second device is to use the guard band to maintain communication with the first device; and
- sending a second message to the second device including control channel tuning information associated with the guard band, wherein the second message comprises a Public Action Frame comprising a public action field and a control channel tuning information field.

17. The media of claim 16, wherein determining that the whitespace map is unavailable for communication between the first device and the second device is responsive to receiving an indication of the unavailability of the whitespace map from a geolocation database.

18. The media of claim 17, wherein the indication of the unavailability of the whitespace map includes a null whitespace map.

19. The media of claim 16, wherein the first message is a Channel Availability Query (CAQ) response message having a field set to a predetermined value.

20. The media of claim 16, wherein the control channel tuning information includes at least one of a frequency, a symbol rate, a forward error correcting scheme, and a modulation scheme associated with the guard band.

21. The media of claim 16, wherein the public action field is set to a predetermined value and the control channel tuning information field includes the control channel tuning information.

* * * * *